United States Patent
Kaeb et al.

(10) Patent No.: US 10,214,361 B2
(45) Date of Patent: Feb. 26, 2019

(54) RAKE DEVICE ON FRICTION-DRIVEN SWEEP CONVEYOR

(71) Applicant: Illinois Grain and Seed, Inc., Cissna Park, IL (US)

(72) Inventors: Todd W. Kaeb, Cissna Park, IL (US); Andrew L. Stock, Cissna Park, IL (US); Nathan L. Kaeb, Cissna Park, IL (US)

(73) Assignee: Illinois Grain & Seed, Inc., Cissna Park, IL (US)

( * ) Notice: Subject to any disclaimer, the term of this patent is extended or adjusted under 35 U.S.C. 154(b) by 0 days.

(21) Appl. No.: 15/825,952

(22) Filed: Nov. 29, 2017

(65) Prior Publication Data

US 2018/0079595 A1    Mar. 22, 2018

Related U.S. Application Data

(63) Continuation of application No. 15/251,965, filed on Aug. 30, 2016, now Pat. No. 9,862,545.
(Continued)

(51) Int. Cl.
*B65G 21/08* (2006.01)
*B65G 21/10* (2006.01)
(Continued)

(52) U.S. Cl.
CPC ............ *B65G 21/08* (2013.01); *B65G 21/10* (2013.01); *B65G 39/00* (2013.01); *B65G 45/12* (2013.01); *B65G 65/425* (2013.01)

(58) Field of Classification Search
CPC ........ B65G 45/12; B65G 45/16; B65G 45/26; B65G 21/08; B65G 21/10; B65G 65/425; B65G 65/466; B65G 39/00; A01F 25/2018
(Continued)

(56) References Cited

U.S. PATENT DOCUMENTS 689,881 A    12/1901  Hoy
2,801,137 A *  7/1957  Clay ...................... B65G 53/00
                                          406/114
(Continued)

FOREIGN PATENT DOCUMENTS

DE           3940786 C1     5/1991

OTHER PUBLICATIONS

Machine translation of Foreign Patent Citation 1—Patent No. DE3940786C1.

*Primary Examiner* — Mark A Deuble
(74) *Attorney, Agent, or Firm* — Daniel J. Coughlin; Coughlin Law Office LLC

(57) ABSTRACT

We disclose an apparatus for maintaining a flow of grain moving toward a rotating sweep conveyor. A rake extends longitudinally along the sweep. The rake is disposed along the leading sidewall of the sweep such that the rake is in the path of movement of the sweep as the sweep rotates within the bin. The rake has a plurality of projections that protrude from a shaft. A reciprocating drive assembly is connected to the driven roller and to the shaft. The reciprocating drive assembly causes the shaft to move forward and backward along the longitudinal axis of the sweep. The reciprocating shaft movement causes the projections to engage grain piles in the path of the sweep, causing the pile to collapse into a flowable particulate to be received by the sweep.

16 Claims, 8 Drawing Sheets

Related U.S. Application Data

(60) Provisional application No. 62/327,566, filed on Apr. 26, 2016, provisional application No. 62/212,565, filed on Aug. 31, 2015.

(51) Int. Cl.
   *B65G 39/00* (2006.01)
   *B65G 45/12* (2006.01)
   *B65G 65/42* (2006.01)

(58) Field of Classification Search
   USPC .................................................. 414/311, 321
   See application file for complete search history.

(56) References Cited

U.S. PATENT DOCUMENTS

| | | | |
|---|---|---|---|
| 2,801,730 A | 8/1957 | Strickler | |
| 3,822,796 A * | 7/1974 | Buschbom | A01F 25/2009 |
| | | | 414/320 |
| 4,063,654 A * | 12/1977 | Shivvers | B65G 65/466 |
| | | | 414/309 |
| 4,202,437 A | 5/1980 | Gordon | |
| 4,944,386 A | 7/1990 | Swinderman | |
| 5,355,992 A | 10/1994 | Baig et al. | |
| 5,660,283 A | 8/1997 | Groh et al. | |
| 6,318,545 B1 | 11/2001 | Paul | |
| 7,014,035 B2 | 3/2006 | Wiggins | |
| 7,383,944 B2 | 6/2008 | Hall et al. | |
| 7,484,617 B1 | 2/2009 | Flood et al. | |
| 7,882,943 B1 | 2/2011 | Schoonover | |
| 8,770,390 B2 | 7/2014 | Neufeld et al. | |
| 9,199,807 B1 | 12/2015 | Schuelke | |
| 9,288,946 B1 | 3/2016 | Schuld | |
| 2010/0074724 A1 * | 3/2010 | Saari | B65G 65/28 |
| | | | 414/800 |
| 2010/0239399 A1 * | 9/2010 | Hoogestraat | B65G 65/466 |
| | | | 414/310 |
| 2014/0262688 A1 | 9/2014 | Brunone | |
| 2016/0107843 A1 | 4/2016 | Hartney et al. | |
| 2017/0183173 A1 * | 6/2017 | Hoogestraat | B65G 65/4836 |

* cited by examiner

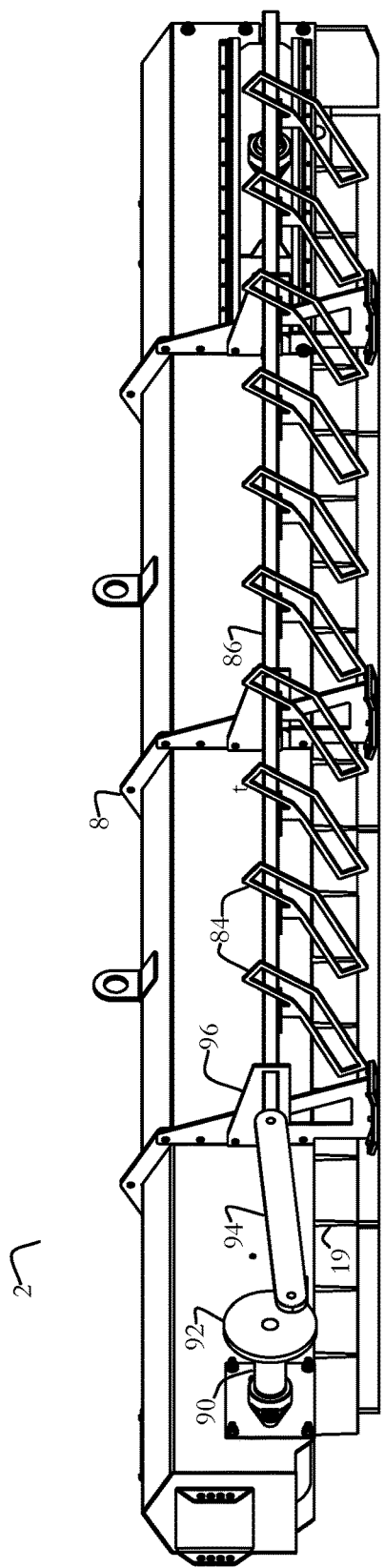

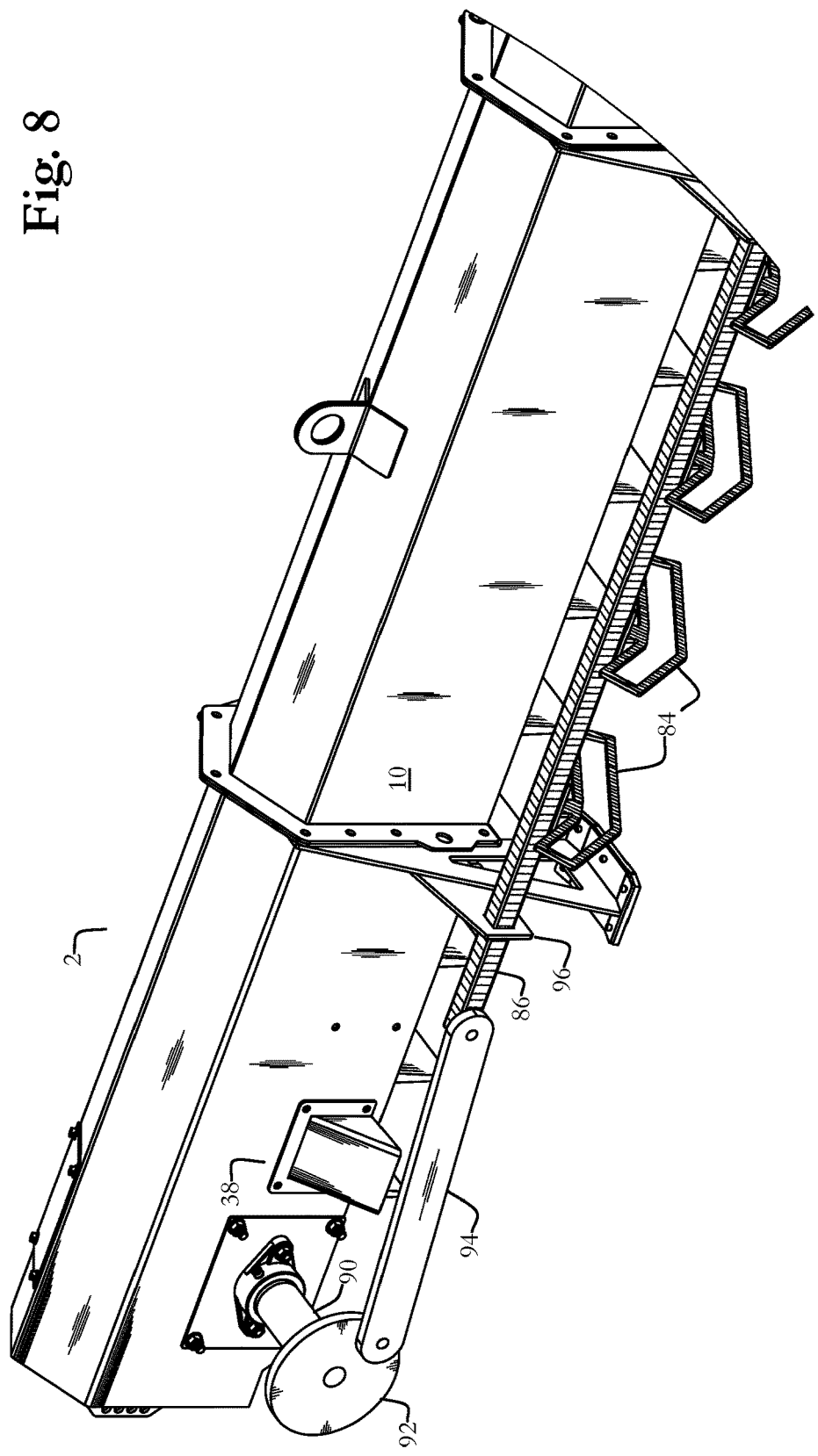

RAKE DEVICE ON FRICTION-DRIVEN SWEEP CONVEYOR

CROSS REFERENCES

This application is a continuation of U.S. patent application Ser. No. 15/251,965 filed 30 Aug. 2016, which is an application claiming the benefit of U.S. Provisional Application No. 62/212,565 filed Aug. 31, 2015 and U.S. Provisional Application No. 62/327,566, filed Apr. 26, 2016.

REFERENCE TO CDS

Not Applicable.

FIELD OF THE INVENTION

The present disclosure relates to sweeps for agricultural grain storage bins, and more particularly, to sweep devices used primarily, but not exclusively, for removing residual seed and grain from a storage bin after the majority of grain or seed has been removed by an underlying conveyor.

BACKGROUND

Seed and grain are commonly stored in grain bins and related storage structures. Rotating sweep conveyors are commonly used to remove seed or grain from the floor of a grain storage bin. Sweep conveyors rotate about a central pivot point. These sweep conveyors sweeping residual seed or grain toward a central discharge chute for transferring the seed or grains to a wait truck, trailer, rail car, etc. Sweep conveyors of this nature are commonly screw auger type or chain driven paddle conveyors. Power can either be transferred from the unload conveyor—as described in U.S. Pat. No. 7,544,031—or the sweep can be powered with a dedicated electric motor, or equivalent power source. The sweep conveyor transfers power from the power source, through the auger or chain to turn an idler roller. The idler roller is coupled to a distal drive wheel such that power is transferred from the conveyor to the drive wheel. The driven wheel is mounted perpendicular to the length of the sweep conveyor and drives the sweep about the pivot point, like the hand of a clock.

SUMMARY

We disclose a sweep conveyor that has a friction-driven belt conveyor for the safe removal of grain piles without manual user intervention and that also prevents dust and particulate from affecting the coupling of the drive roller to the inner surface of the conveyor belt. In existing grain bin unload systems, the stored grain is discharged through a central well before a sweep auger is employed to remove the residual grain.

The conveyor belt is stretched between two end rollers: a driven roller and a second roller. The driven roller and the second roller are mounted at the opposite ends of a sweep conveyor frame. The sweep conveyor frame has a top wall, a leading sidewall, and a trailing sidewall. The idler roller is mounted on a tracking assembly that slides along the conveyor frame on a series of guiderails. The conveyor belt has an upper belt portion that is moving toward the idler roller and a lower belt portion that is moving toward the driven roller. The conveyor belt itself has an outer surface that is oriented toward the product and an inner surface that contacts the end rollers.

The conveyor belt is powered by a driven roller. The power source can be a dedicated motor or by coupling the driven roller to the unload conveyor. In existing sweep conveyors, the driven roller commonly used is a toothed sprocket that engages a chain belt. Chain belts have been preferred because the sweeps are used in conditions where the sweep is submerged in the seed or grain within the storage bin. Particulates, such as dust, grains, or seed, compromise the ability of the driven roller to maintain sufficient friction with the inner belt surface.

We disclose a friction-driven sweep conveyor having a roller guard assembly to prevent particulate matter from entering into the interface between a driven roller and an inner surface of a continuous conveyor belt. The roller guard assembly can be comprised of a retaining wall member and a mounting member.

At least one roller guard assembly is disposed adjacent to the driven roller. The roller guard assembly is positioned to prevent a substantial amount of particulate from entering the area of the conveyor where the roller interfaces with the belt. In this way, a roller guard assembly positioned near the drive roller maintains an operable interface between the drive roller and the belt, thereby moving the belt. The angled roller guard assembly is disposed between the inner surface of the lower belt portion and the inner surface of the upper belt portion.

One advantage of the present disclosure is that it improves the transfer of energy in a friction-driven belt conveyor in operating conditions where the sweep conveyor is submerged in seed or grain stored within a storage bin. Friction-driven belt conveyor are advantageous because the roller-belt interface causes less damage to the seed and grain product than the steel toothed sprocket-chain interface.

Another advantage of the present disclosure is that the sweep can also have a discharge aperture located in one of the sidewalls of the sweep and the retaining wall can be oriented at an angle that is neither parallel with nor at a right angle to the longitudinal axis of the belt and at such an angle that particulates carried on the inner surface of the lower belt portion are directed toward the discharge aperture in the first sidewall. By discharging the material through the leading sidewall, the material is discharged into the path of the sweep conveyor. Accordingly, the grain is removed through the regular movement of the sweep.

Sweep conveyors are commonly used to remove grains from grain bins. Certain grains, like rice or other grains having higher moisture content, have a high angle of repose. As such, the grain remains in tall grain piles that are difficult for the sweep to engage. In order to remove piled grains from within a grain bin, operators currently enter the bin and manually knock down the grain while leaning over the operating sweep. Entrapment within a grain bin can result in death or serious injury. Even if death or injury does not occur, the temperature inside grain bins often exceed 100 degrees Fahrenheit with minimal air flow, making it an uncomfortable environment for manual labor.

We also disclose an apparatus for maintaining a flow of grain moving toward the sweep. A rake extending longitudinally along the sweep. The rake is disposed along the leading sidewall of the sweep such that the rake is in the path of movement of the sweep as the sweep rotates within the bin.

The rake has a plurality of projections that protrude from a shaft. In one embodiment, the projections are tines, that extend out from the shaft toward the direction of the sweep movement. In one embodiment, the projections are spring mounted. In one embodiment, the projections are fixed and inflexible. In one embodiment, the projections are removable. In one embodiment, the projections are adjustably mounted along the shaft such that the longitudinal space between projections can be changed.

A reciprocating drive assembly is connected to the driven roller and to the shaft. The reciprocating drive assembly causes the shaft to move forward and backward along the longitudinal axis of the sweep. The reciprocating shaft movement causes the projections to engage grain piles in the path of the sweep, causing the pile to collapse into a flowable particulate to be received by the sweep.

One advantage of the current disclosure is that existing sweeps are not able to adequately break up tall piles of grain. For example, rice has a very high angle of repose as shown in FIGS. 1 and 2. As such, rice does not flow well as the sweep moves about the grain bin. In order to remove piled grains from within a grain bin, operators need to enter the bin and manually knock down the grain while leaning over the operating sweep. Entrapment within a grain bin can result in death or serious injury. Even if death or injury does not occur, the temperature inside grain bins often exceed 100 degrees Fahrenheit with minimal air flow, making it an uncomfortable environment for manual labor.

Stored grain can form frozen, compacted, or bridged aggregates or chunks. Another advantage of the current disclosure is the efficient breaking apart of these hardened aggregates of grain that form within a bin. The apparatus is capable of breaking up any hardened aggregates of grain so they can be swept or augered to the center well as a flowable particulate.

It is understood that other embodiments will become readily apparent to those skilled in the art from the following detailed description, wherein various embodiments are shown and described by way of illustration only. As will be realized, the concepts are capable of other and different embodiments and their several details are capable of modification in various other respects, all without departing from the spirit and scope of what is claimed as the invention. Accordingly, the drawings and detailed description are to be regarded as illustrative in nature and not as restrictive.

BRIEF DESCRIPTION OF DRAWINGS

Aspects are illustrated by way of example, and not by way of limitation, in the accompanying drawings, wherein:

FIG. 7 shows a front side perspective view of an embodiment of the sweep conveyor showing the leading sidewall and rake;

FIG. 8 shows a top side perspective view of the embodiment shown in FIG. 7, showing a closer view of the reciprocating drive assembly.

Figure 1:
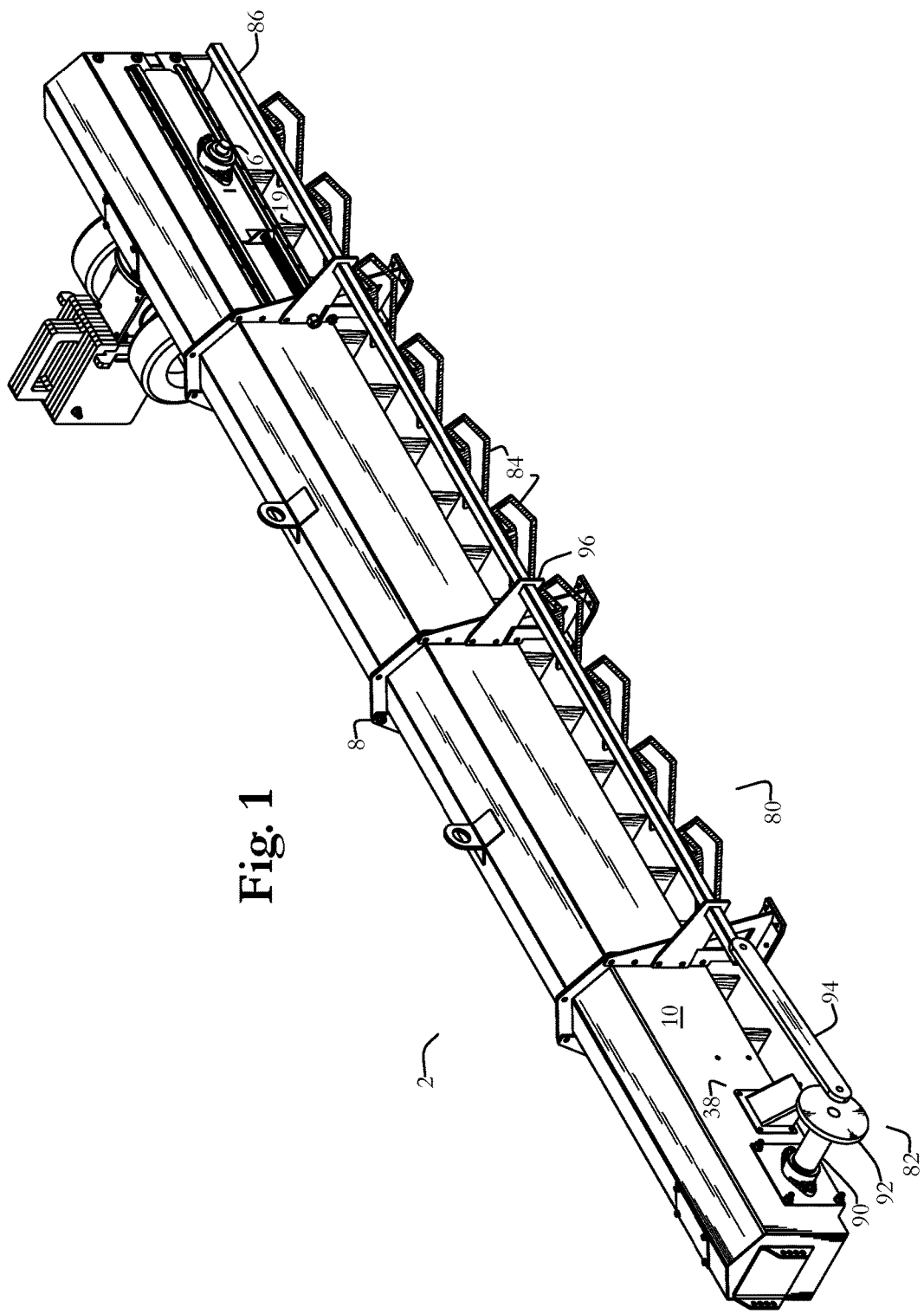
FIG. 1 shows a top side perspective view of an embodiment of the sweep and rake.
Figure 2:
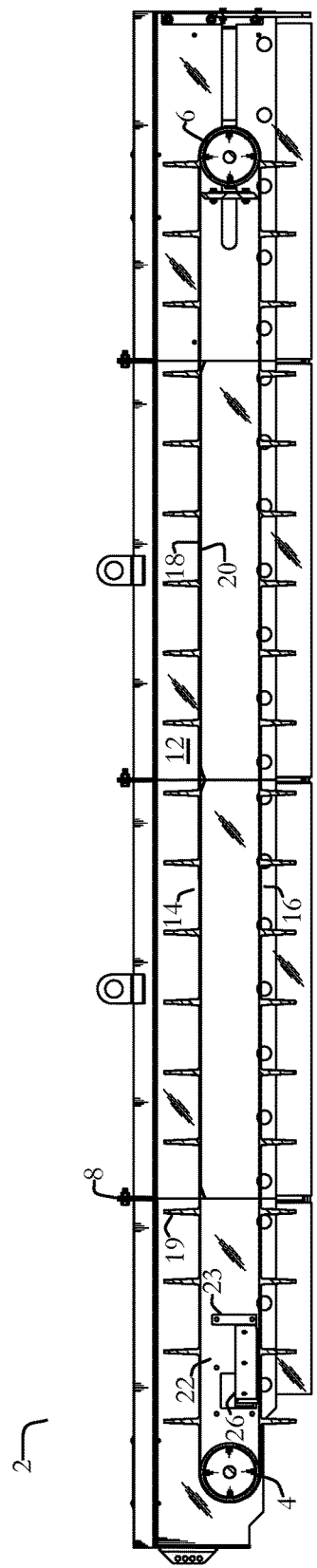
FIG. 2 shows a side perspective view of an embodiment of the sweep with the leading sidewall removed.
Figure 3:
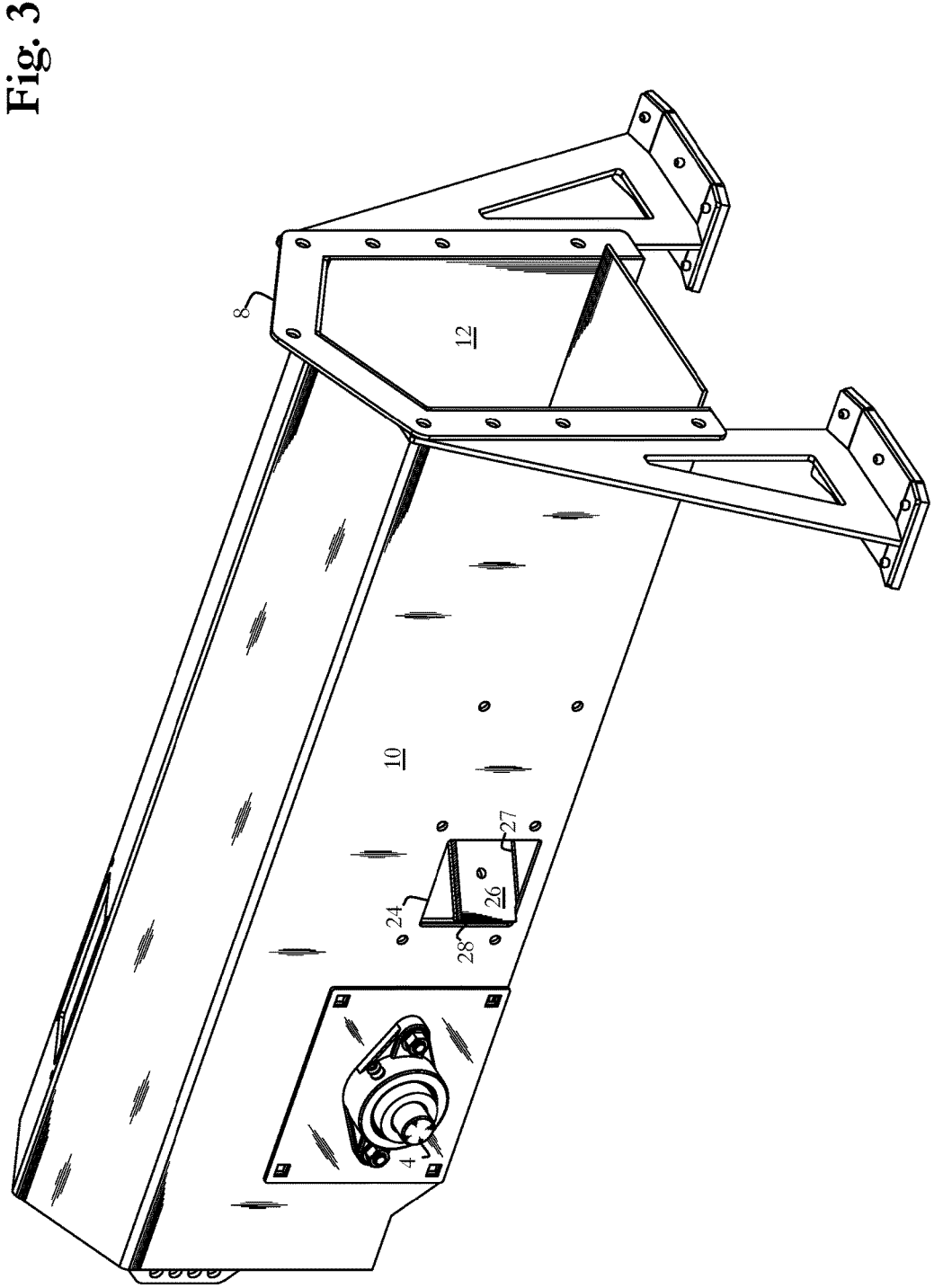
FIG. 3 shows a side perspective view of the proximal end portion of an embodiment of the sweep conveyor, with the hood removed.
Figure 4:
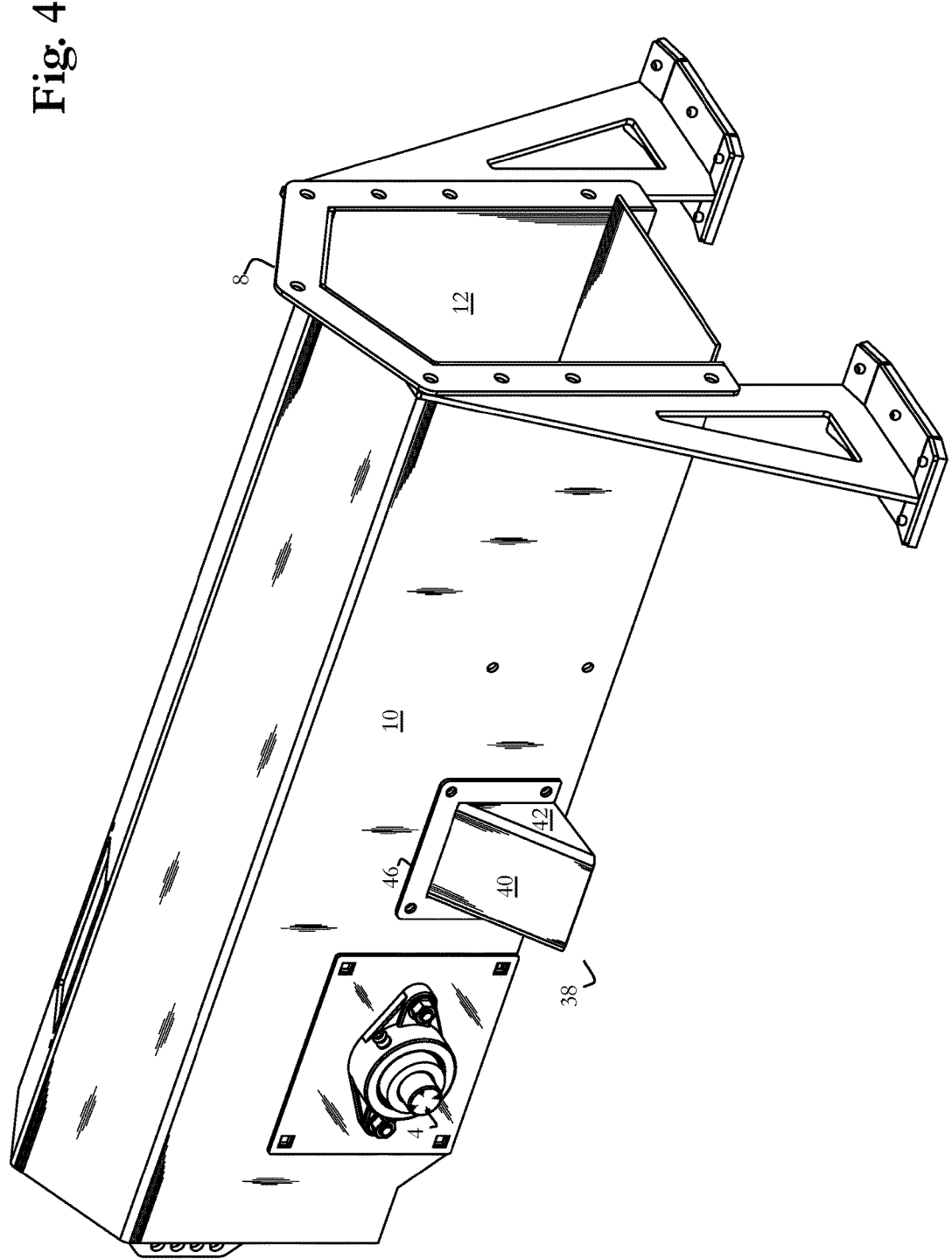
FIG. 4 shows a side perspective view of the proximal end portion of an embodiment of the sweep conveyor.
Figure 5:
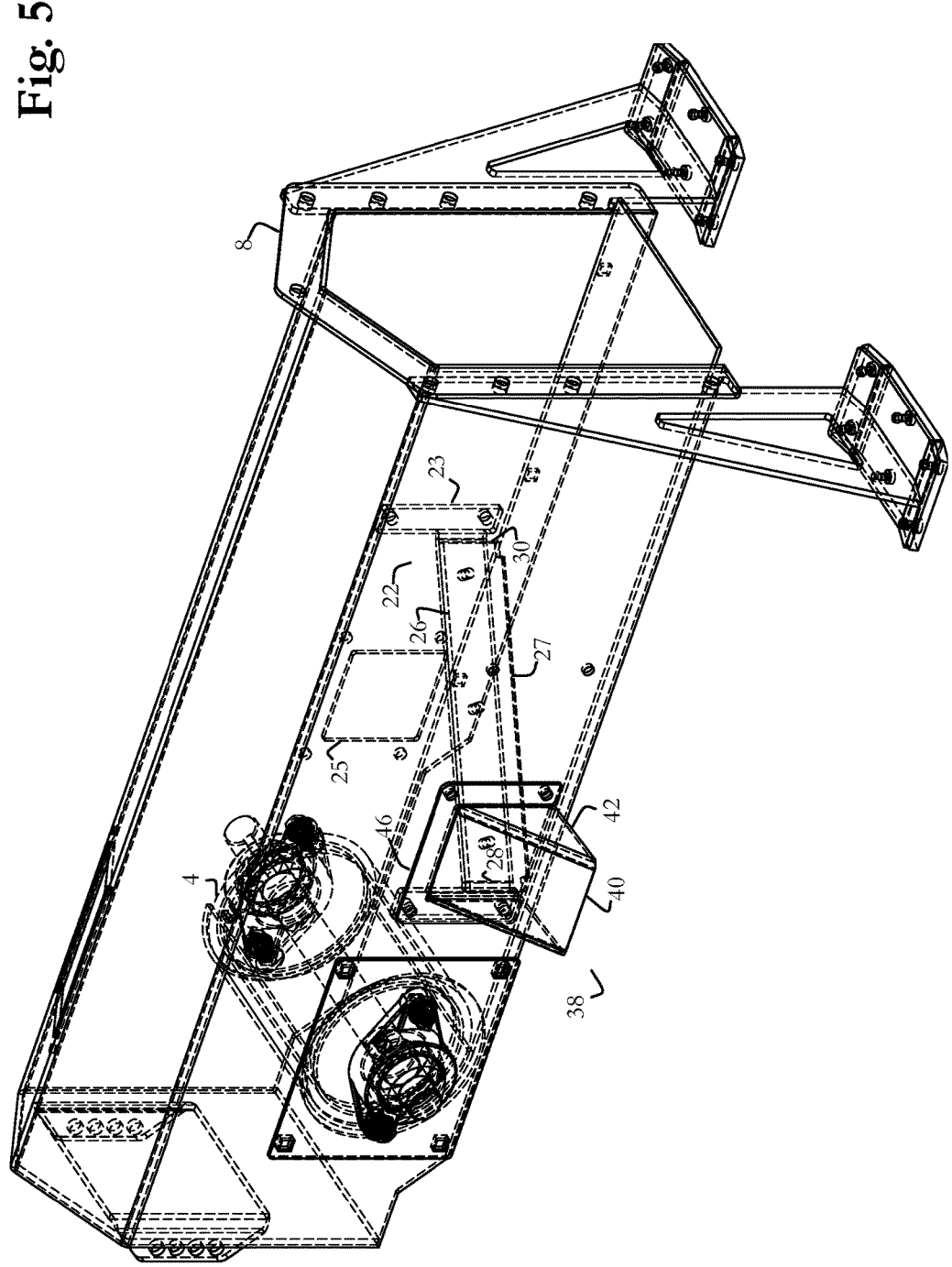
FIG. 5 shows another view of the embodiment shown in FIG. 4, wherein the internal elements of the sweep are shown as dotted lines.
Figure 6:
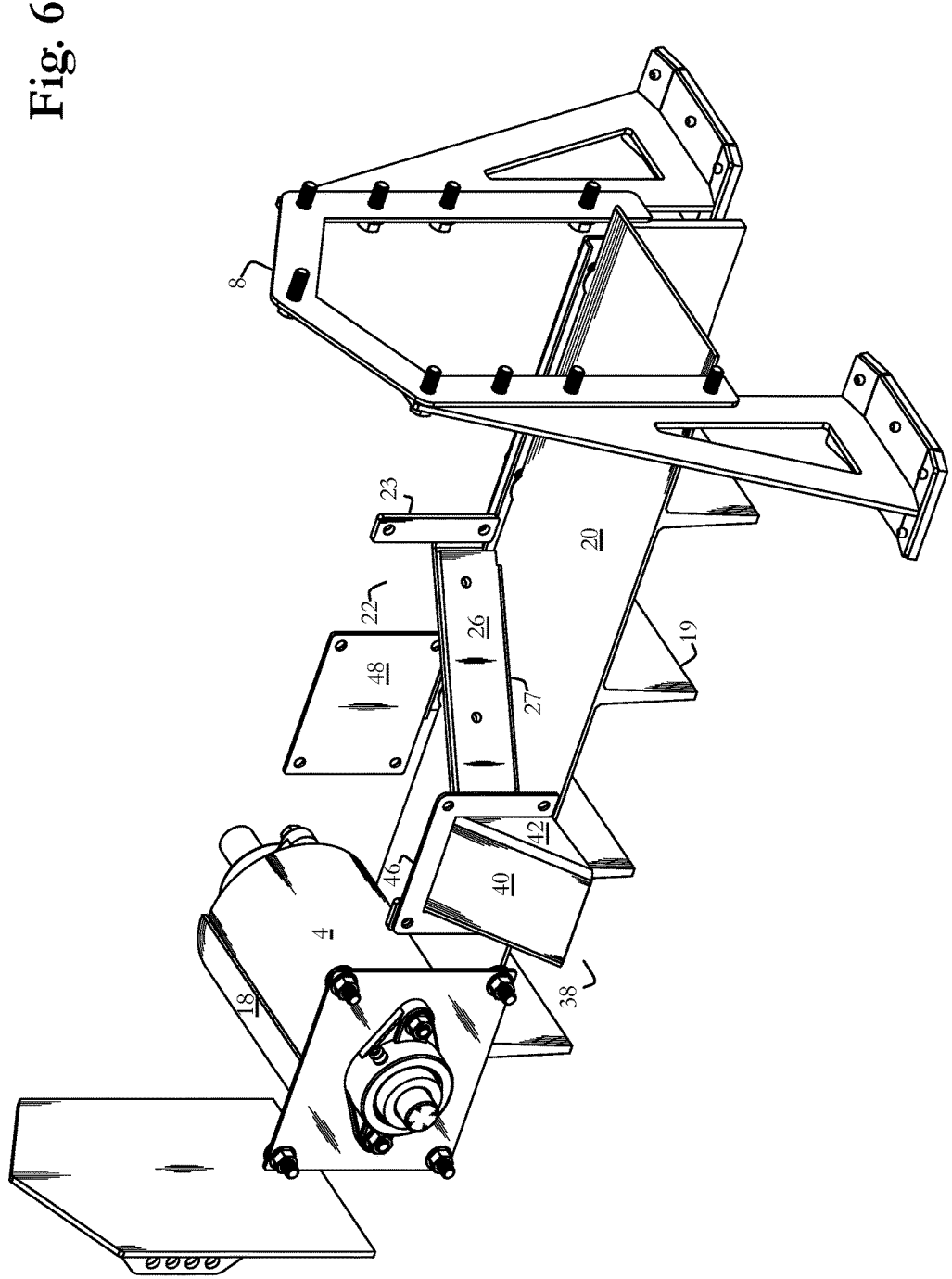
FIG. 6 shows another view of the embodiment shown in FIG. 4, wherein the walls of the conveyor frame are hidden from view and a portion of the upper belt portion is removed to reveal an embodiment of the roller guard assembly.

We claim:
1. A method for providing a sweep conveyor with flowable grain from a grain pile without manual user intervention, the method comprising the steps of:
 a. mounting a rake having a projection unit to a sweep conveyor such that the projection unit extends into a path of movement of the sweep conveyor as the sweep conveyor rotates;
 b. rotating the sweep conveyor along the path of movement; and
 c. reciprocating the rake through a drive assembly operably coupled to the rake and a driven roller of the sweep conveyor to collapse the grain pile and provide the sweep conveyor with flowable grain without manual user intervention.

2. The method of claim 1, wherein the rake comprises a plurality of projection units that are longitudinally spaced-apart and protrude from a shaft, wherein the shaft extends along a longitudinal axis of the sweep conveyor.

3. The method of claim 2, further comprising the step of:
 a. coupling a reciprocating drive assembly to the shaft to move the shaft forward and backward along a longitudinal axis of the sweep conveyor; and
 b. reciprocating the plurality of projection units.

4. The method of claim 2, wherein at least one of the plurality of projection units further comprises a rectangular frame and a raised front portion.

5. The method of claim 1, further comprising the step of:
 a. coupling a reciprocating drive assembly to a driven roller of the sweep conveyor; and
 b. coupling the reciprocating drive assembly to the rake to move the rake.

6. The method of claim 1, wherein the sweep conveyor is an auger.

7. A sweep conveyor configured to rotate within a bin along a path, the sweep conveyor comprising:
 a. a rake having a projection unit that extends into a path of movement of the sweep conveyor as the sweep conveyor rotates;
 b. a driven roller disposed within the sweep conveyor; and
 c. a reciprocating drive assembly operably coupled to the rake and the driven roller.

8. The sweep conveyor of claim 7, wherein the rake further comprises:
 a. a shaft; and
 b. a plurality of project units longitudinally spaced apart along the shaft.

9. The sweep conveyor of claim 8, wherein the shaft extends along a longitudinal axis of the sweep conveyor.

10. The sweep conveyor of claim 7, wherein the projection unit further comprises a lower rear portion configured to engage grain aggregates that would otherwise be too large to enter the sweep conveyor.

11. The sweep conveyor of claim 7, wherein conveyor is an auger.

12. The sweep conveyor of claim 7, wherein the rake further comprises a plurality of projection units.

13. A sweep conveyor configured to rotate within a bin along a path, the sweep conveyor comprising:
 a. a rake having a projection unit that extends into a path of movement of the sweep conveyor as the sweep conveyor rotates, wherein the projection unit comprises:
  i. a raised front portion; and
  ii. a hollow center; and
 b. a reciprocating drive assembly operably coupled to the rake.

14. A rake kit for use with a sweep conveyor having a conveyor frame, a driven roller, the sweep conveyor having a longitudinal axis, the rake kit comprising:
 a. a shaft;
 b. a plurality of projection units having a hollow center and extending from the shaft; and
 c. a plurality of guide elements configured to be mounted to the conveyor frame along the longitudinal axis of the sweep conveyor for supporting the shaft.

15. The rake kit of claim 14, further comprising:
 a. a reciprocating drive assembly operably coupled to the shaft.

16. The rake kit of claim 15, wherein the reciprocating drive assembly is configured to be operably coupled to the driven roller.

\* \* \* \* \*